(12) United States Patent
Kawaura et al.

(10) Patent No.: US 10,247,204 B2
(45) Date of Patent: Apr. 2, 2019

(54) HYDRAULIC CONTROL APPARATUS AND HYDRAULIC CONTROL METHOD

(71) Applicant: YAMADA MANUFACTURING CO., LTD., Kiryu-shi (JP)

(72) Inventors: Yoshiaki Kawaura, Kiryu (JP); Masato Izutsu, Kiryu (JP); Kenichi Fujiki, Kiryu (JP); Yasuhiko Kan, Kiryu (JP); Hiroyuki Taguchi, Kiryu (JP); Yoshiro Umezawa, Kiryu (JP); Shimpei Iizuka, Kiryu (JP)

(73) Assignee: YAMADA MANUFACTURING CO., LTD., Kiryu-Shi, Gunma (JP)

( * ) Notice: Subject to any disclaimer, the term of this patent is extended or adjusted under 35 U.S.C. 154(b) by 182 days.

(21) Appl. No.: 15/464,601

(22) Filed: Mar. 21, 2017

(65) Prior Publication Data
US 2017/0284424 A1    Oct. 5, 2017

(30) Foreign Application Priority Data

Apr. 1, 2016  (JP) ................................ 2016-074632
Feb. 28, 2017  (JP) ................................ 2017-036488

(51) Int. Cl.
| F15B 1/02 | (2006.01) |
| F15B 11/16 | (2006.01) |
| F16H 61/00 | (2006.01) |
| F15B 1/033 | (2006.01) |
| F16H 63/30 | (2006.01) |
| F16H 59/74 | (2006.01) |

(52) U.S. Cl.
CPC .............. *F15B 1/024* (2013.01); *F15B 1/033* (2013.01); *F15B 11/16* (2013.01); *F16H 61/0021* (2013.01); *F16H 63/3026* (2013.01); *B60Y 2300/18016* (2013.01); *F15B 2211/20523* (2013.01); *F15B 2211/426* (2013.01); *F15B 2211/625* (2013.01); *F15B 2211/633* (2013.01); *F16H 2059/746* (2013.01); *F16H 2061/0034* (2013.01)

(58) Field of Classification Search
CPC .......... F15B 1/024; F15B 11/16; F15B 1/033; F16H 2061/0034; F16H 61/0021; B60Y 2300/18016
USPC ......................................................... 60/413
See application file for complete search history.

(56) References Cited

U.S. PATENT DOCUMENTS

| 8,763,638 B2 * | 7/2014 | Deubler ................ F16K 31/122 137/565.14 |
| 2012/0324873 A1 * | 12/2012 | Pekarsky ................ F15B 1/027 60/327 |

FOREIGN PATENT DOCUMENTS

| JP | H 08-014076 A | 1/1996 |
| JP | 2000-313252 A | 11/2000 |

* cited by examiner

*Primary Examiner* — F Daniel Lopez
*Assistant Examiner* — Daniel S Collins
(74) *Attorney, Agent, or Firm* — McGinn IP Law Group, PLLC.

(57) ABSTRACT

A hydraulic control apparatus includes: a branch path that branches from a passage connected to an oil pump and equipment to which oil is supplied by the oil pump; an accumulator connected to the branch path to accumulate and discharge high-pressure oil supplied from the branch path; a check valve provided in an oil inlet path through which oil flows into the accumulator; a balance valve unit including a reference pressure chamber, a balance valve body that is biased toward an opening side by an opening compression spring, and a control pressure chamber; and a control solenoid that introduces or discharges the high-pressure oil into or from the control pressure chamber.

15 Claims, 7 Drawing Sheets

Fig.1A  DURING NORMAL OPERATION OF OIL PUMP 1
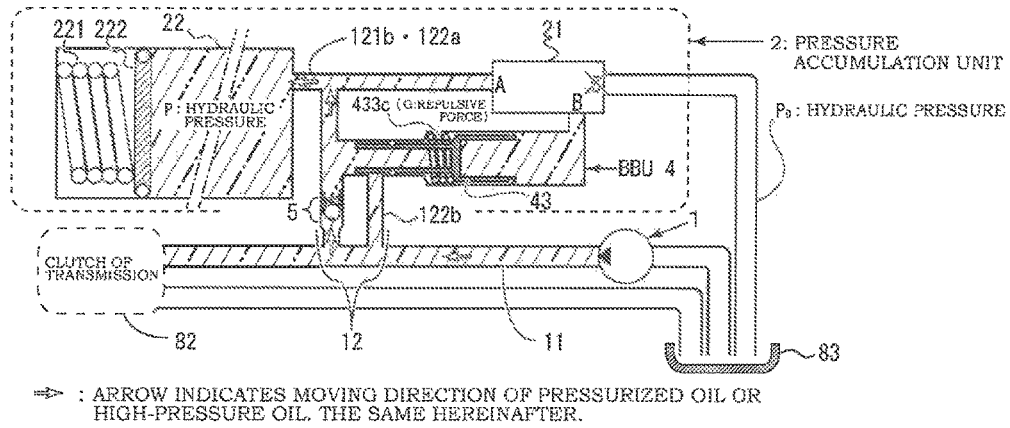
→ : ARROW INDICATES MOVING DIRECTION OF PRESSURIZED OIL OR HIGH-PRESSURE OIL. THE SAME HEREINAFTER.
Fig.1B  DURING IDLING STOP
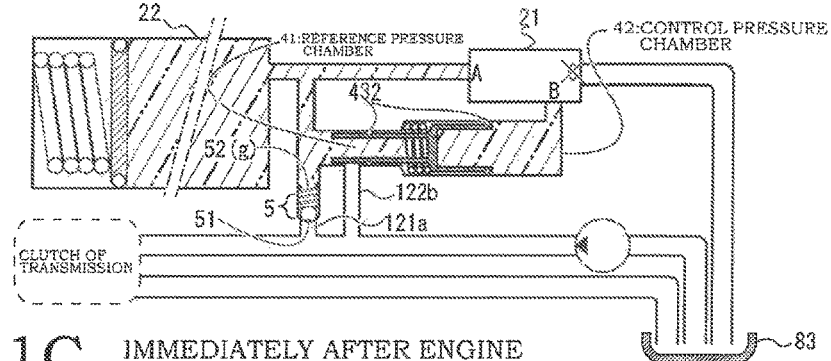
Fig.1C  IMMEDIATELY AFTER ENGINE RESTART COMMAND IS ISSUED
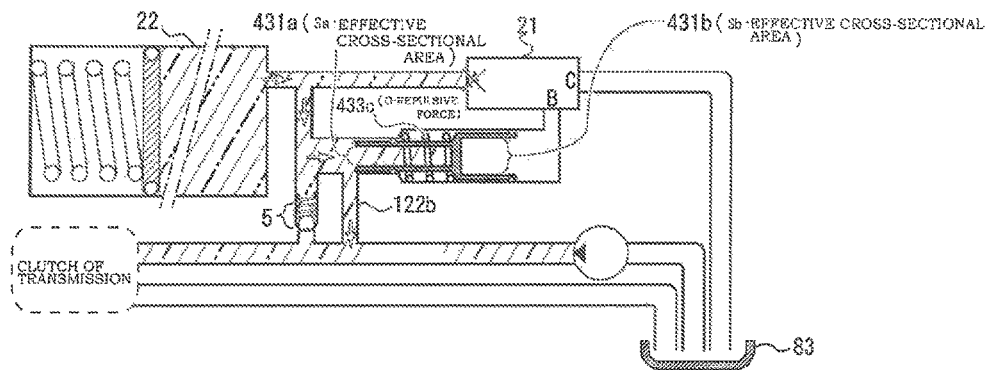

Fig. 3  TABLE ILLUSTRATING RELATION OF CLOSED/OPEN STATE OF DISCHARGE PATH

| OPERATION STATE OF OIL PUMP | MODE OF CONTROL SOLENOID 21 | CONNECTION /DISCONNECTION STATE OF CONTROL SOLENOID 21 | HYDRAULIC PRESSURE DIFFERENCE BETWEEN BOTH CHAMBERS | CLOSED/OPEN STATE OF DISCHARGE PATH 122 |
|---|---|---|---|---|
| DURING NORMAL OPERATION | MODE A | PATHS B AND A ARE CONNECTED PATHS B AND C ARE DISCONNECTED | SMALL | VALVE BODY CLOSED DISCHARGE PATH CLOSED |
| DURING IDLING STOP | MODE A | PATHS B AND A ARE CONNECTED PATHS B AND C ARE DISCONNECTED | SMALL | VALVE BODY CLOSED DISCHARGE PATH CLOSED |
| IMMEDIATELY AFTER ENGINE RESTART COMMAND IS ISSUED | MODE C | PATHS B AND A ARE DISCONNECTED PATHS B AND C ARE CONNECTED | LARGE | VALVE BODY OPEN DISCHARGE PATH OPEN |

Fig.5A  DURING NORMAL OPERATION OF OIL PUMP 1
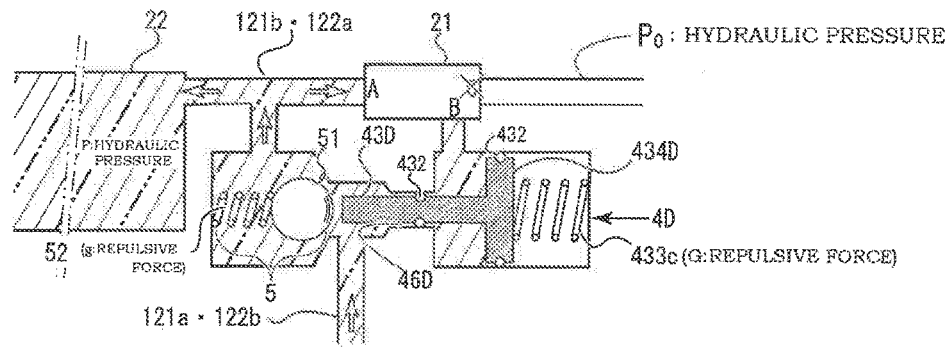
Fig.5B  DURING IDLING STOP
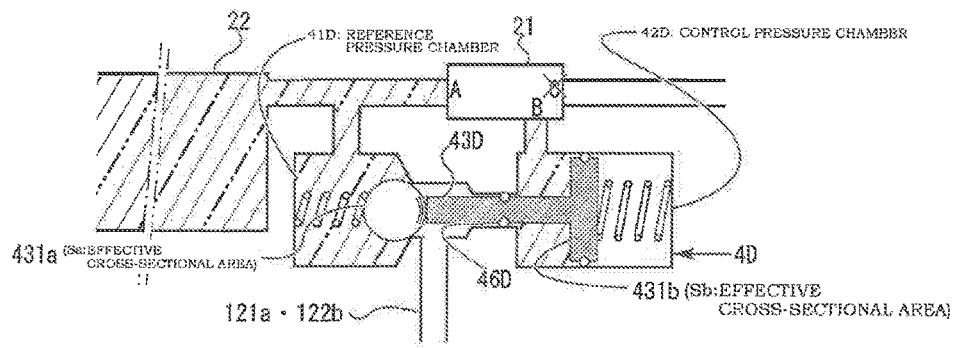
Fig.5C  IMMEDIATELY AFTER ENGINE RESTART COMMAND IS ISSUED
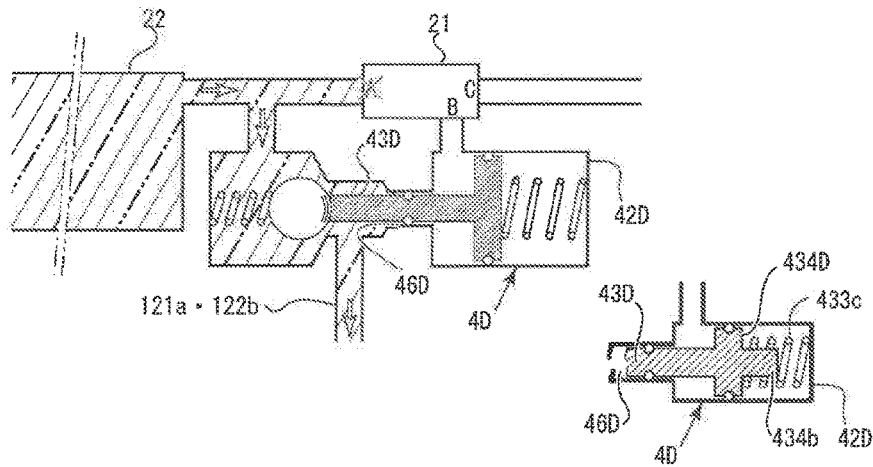
Fig.5D Fig.6A DURING NORMAL OPERATION OF OIL PUMP 1
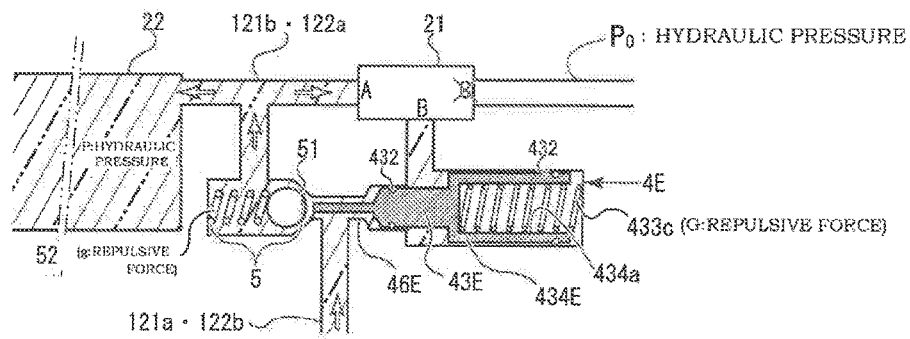
Fig.6B DURING IDLING STOP
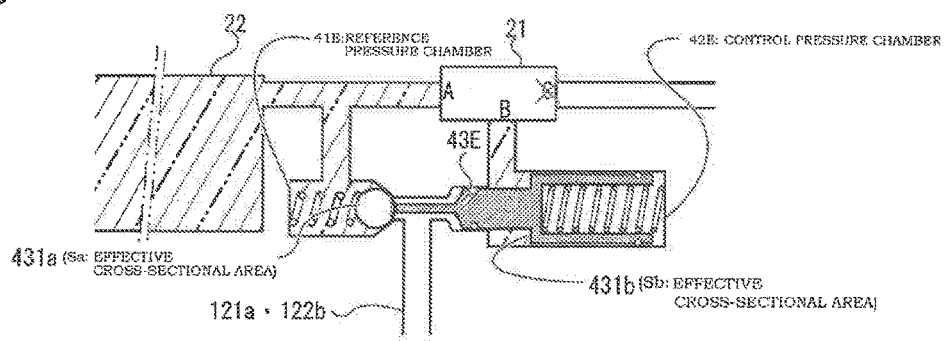
Fig.6C IMMEDIATELY AFTER ENGINE RESTART COMMAND IS ISSUED
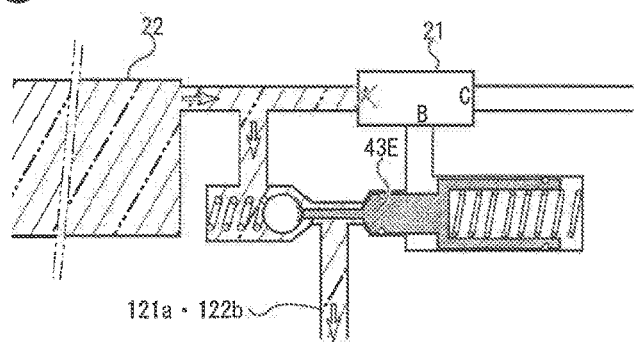

Fig.7A  DURING NORMAL OPERATION OF OIL PUMP
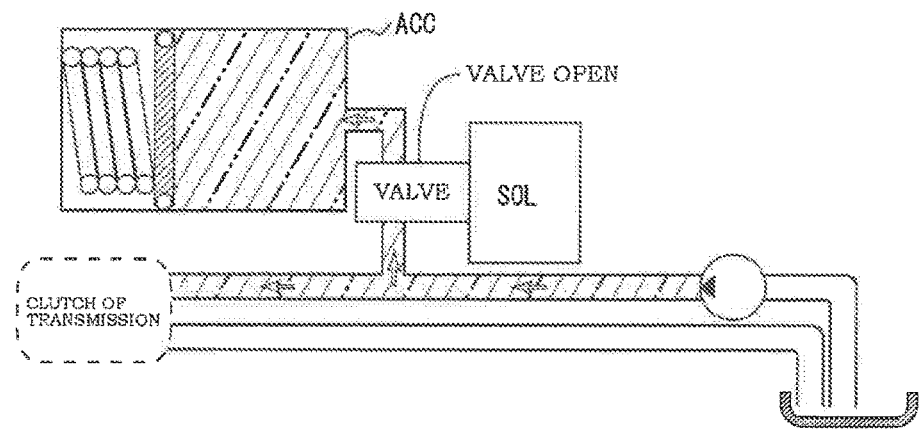
Fig.7B  DURING IDLING STOP
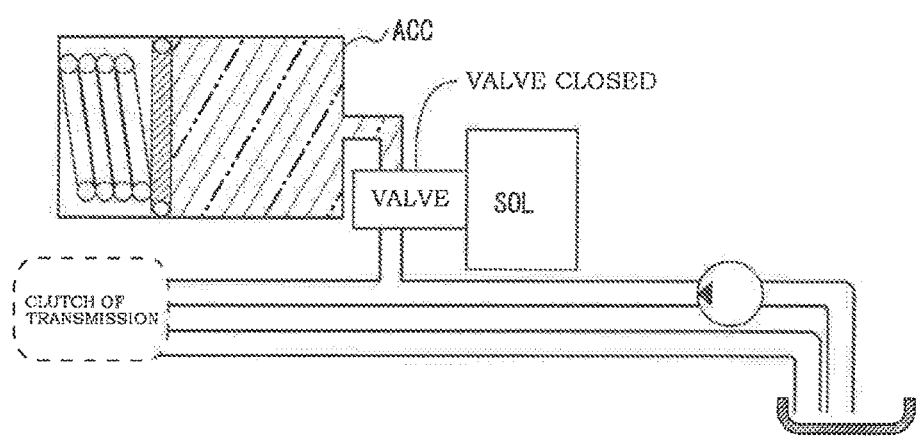
Fig.7C  IMMEDIATELY AFTER ENGINE RESTART COMMAND IS ISSUED
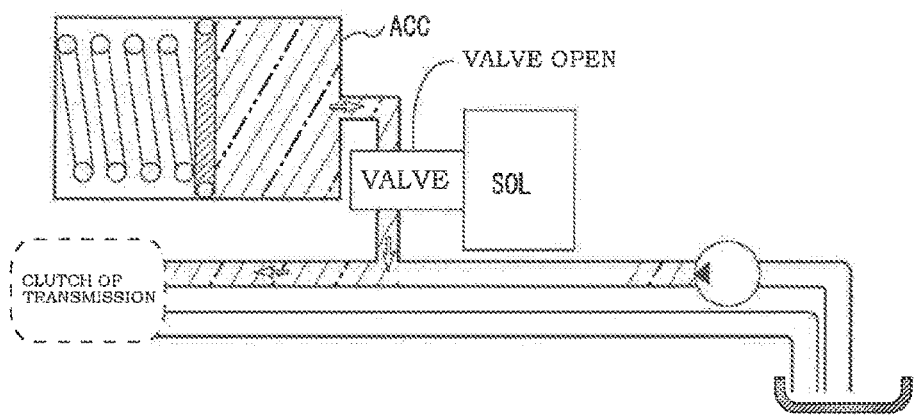

HYDRAULIC CONTROL APPARATUS AND HYDRAULIC CONTROL METHOD

BACKGROUND OF THE INVENTION

1. Field of the Invention

The present invention relates to a hydraulic control apparatus and a hydraulic control method which are applied to automobiles.

2. Description of the Related Art

Hydraulic pressure necessary for a clutch operation of an automobile is supplied by an electric pump or an oil pump powered by engine rotation. In recent years, in order to improve fuel economy and conserve environment, automobiles having an idling stop function are increasing. However, when the engine is stopped by the idling stop function, an oil pump which has been operated with the engine rotation also stops and the hydraulic pressure decreases. In this case, a problem arises in that, when the engine restarts, a clutch cannot be connected immediately and the start of an automobile is hindered.

In an engine automatic stop-start apparatus disclosed in Japanese Patent Application Publication No. H8-14076, in order to prevent a decrease in hydraulic pressure due to a stop of an oil pump, a check valve (reference numeral 63 in Japanese Patent Application Publication No. H8-14076) is provided between the oil pump and an AT hydraulic unit (a clutch hydraulic unit). In this way, leaking of oil from the AT hydraulic unit is prevented even when the oil pump stops and the hydraulic pressure decreases. Furthermore, an accumulator or an electric oil pump is provided between the oil pump and the AT hydraulic unit so as to maintain the hydraulic pressure.

In a vehicle engine restart control apparatus disclosed in Japanese Patent Application Publication No. 2000-313252, an accumulator (reference numeral 53 in Japanese Patent Application Publication No. 2000-313252) having a solenoid-type switching valve (reference numeral 57 in Japanese Patent Application Publication No. 2000-313252) is provided in a passage between an oil pump (denoted by reference numeral 9 in Japanese Patent Application Publication No. 2000-313252) and a clutch (reference numeral C1 and C2 in Japanese Patent Application Publication No. 2000-313252) (see FIG. 4 in Japanese Patent Application Publication No. 2000-313252). When the engine stops, the oil pump 9 which uses the engine rotation also stops, and the hydraulic pressure of the passage decreases. However, when the switching valve 57 is closed with the stopping of the oil pump 9 to block the accumulator 53 and the passage, it is possible to maintain the hydraulic pressure accumulated in the accumulator 53.

SUMMARY OF THE INVENTION

In the engine automatic stop-start apparatus disclosed in Japanese Patent Application Publication No. H8-14076, the check valve is provided so that oil does not return to the oil pump even when the oil pump stops. However, it is not sufficient for maintaining the hydraulic pressure of the passage including the AT hydraulic unit (the clutch hydraulic unit). Therefore, although the accumulator is provided so as to compensate for this, since a shut-off valve is not present between the accumulator and the passage, there is a problem in that oil accumulation efficiency is poor.

Japanese Patent Application Publication No. H8-14076 also discloses a configuration in which an electric oil pump that operates with the electric power of a battery is provided instead of the accumulator. However, when the electric oil pump is provided in addition to the oil pump, there is a problem in that the apparatus becomes large and heavy and the manufacturing cost increases. Furthermore, there is another problem that fuel economy deteriorates in order to drive the electric oil pump.

In the vehicle engine restart control apparatus disclosed in Japanese Patent Application Publication No. 2000-313252, the solenoid-type switching valve is provided between the accumulator and the passage. Therefore, in a stopped state of the oil pump (in a stopped state of the engine), when a branch path to the accumulator is closed by the switching valve, it is possible to accumulate hydraulic pressure in the accumulator efficiently. However, when the amount of oil flowing into the accumulator is to be increased using this configuration, a switching valve having a large effective cross-sectional area is required. When a switching valve having a large effective cross-sectional area is configured as a solenoid-type switching valve, there is a problem in that a large expensive solenoid valve is required. Particularly, this is a serious problem in middle-size or larger vehicles which require a large amount of accumulated oil.

FIGS. 7A to 7C are conceptual diagrams illustrating an oil accumulation configuration which uses the accumulator disclosed in Japanese Patent Application Publication No. 2000-313252. The accumulator is provided so as to branch halfway from a passage that extends from the oil pump toward a transmission. FIG. 7A illustrates a hydraulic pressure state during a normal operation of an oil pump (that is, in a period in which the oil pump operates with the rotation of the engine). Although a solenoid valve is provided in a branch path to the accumulator, since the valve is open, the hydraulic pressure from the oil pump is accumulated in the accumulator.

When the engine is stopped by the idling stop function, the oil pump also stops and the hydraulic pressure of the passage to the transmission decreases. However, since the solenoid valve is closed with the stopping of the engine or the oil pump, high-pressure oil is maintained in the accumulator.

When the engine restarts, the oil pump also restarts and the hydraulic pressure of the passage facing the transmission starts recovering. However, it takes several hundreds of milliseconds to reach a hydraulic pressure sufficient for operating the transmission. Therefore, the solenoid valve is open according to the restart timing of the engine and the accumulated high-pressure oil is supplied to the passage to the transmission. With this operation, the clutch is connected simultaneously with the start of the engine and the operation of the transmission is enabled.

In a method in which discharge of the oil in the accumulator is controlled by an opening/closing operation of the solenoid valve, the entire oil in the accumulator is discharged via the solenoid valve. Therefore, there is a problem in that a solenoid valve having a large effective cross-sectional area needs to be used when a large amount of oil is discharged in a short period.

Therefore, an object (that is, a technical problem to be solved by) of the present invention is to provide a hydraulic control apparatus and a hydraulic control method capable of accumulating and discharging a large amount of oil in and to an accumulator even when the effective cross-sectional area of a solenoid valve is not increased.

A first embodiment of the present invention solves the problems by a hydraulic control apparatus including: a branch path that branches from a main passage that connects an oil pump that operates with rotation of an engine and equipment to which oil is supplied by the oil pump; an accumulator connected to the branch path; a control solenoid; a reference pressure chamber and a control pressure chamber; and a balance valve unit including a balance valve body and an opening compression spring that biases the balance valve body toward an opening side, wherein a check valve for preventing backflow is provided in an oil inlet path of the branch path, through which oil flows into the accumulator, the balance valve unit is provided in an oil discharge path of the branch path, through which oil is discharged from the accumulator, and the control solenoid is operated to introduce a high-pressure oil into the control pressure chamber such that opening of the balance valve body is suppressed by a hydraulic pressure of the high-pressure oil.

A second embodiment of the present invention solves the problems by the hydraulic control apparatus according to the first embodiment, in which the equipment to which the oil is supplied is a transmission. A third embodiment of the present invention solves the problems by the hydraulic control apparatus according to the first or second embodiment, in which the control solenoid is an electromagnetic control valve which has three oil input/output ports for paths A, B, and C and is switched between a mode A in which the paths B and A are connected and the paths B and C are disconnected and a mode C in which the paths B and C are connected and the paths B and A are disconnected, the path A of the control solenoid, the reference pressure chamber and a downstream side of the check valve of the oil inlet path are connected directly or via the accumulator, and the control pressure chamber and the path B of the control solenoid are connected, when the oil pump performs a pressurization operation or is stopped, the control solenoid is put into the mode A to introduce high-pressure oil into the control pressure chamber so that opening of the balance valve body is suppressed by the hydraulic pressure of the high-pressure oil to close the oil discharge path, and immediately after a command for restarting the engine is issued, the control solenoid is put into the mode C to discharge the high-pressure oil to decrease the hydraulic pressure of the control pressure chamber so that the balance valve body is positioned on the opening side by a repulsive force of the opening compression spring to open the oil discharge path.

A fourth embodiment of the present invention solves the problems by the hydraulic control apparatus according to the third embodiment, in which, in relation to the check valve provided in the middle of the oil inlet path, a portion of the oil inlet path close to the main passage is referred to as an inlet upstream path, and a portion of the oil inlet path close to the accumulator is referred to as an inlet downstream path; in relation to the balance valve unit provided in the middle of the oil discharge path, a portion of the oil discharge path close to the accumulator is referred to as a discharge upstream path, and a portion of the oil discharge path close to the main passage is referred to as a discharge downstream path; the inlet downstream path also serves as the discharge upstream path, and the inlet upstream path also serves as the discharge downstream path; the check valve provided in the oil inlet path is incorporated into the reference pressure chamber, and the balance valve body is inserted through an insertion hole formed between the reference pressure chamber and the control pressure chamber; an O-ring is provided in a lateral portion of the balance valve body, and the opening compression spring moves the balance valve body toward the reference pressure chamber to open the check valve; a piston is provided at one end of the balance valve body present in the control pressure chamber and in a vicinity of the end and the piston receives hydraulic pressure to move the balance valve body toward the control pressure chamber; when the oil pump performs the pressurization operation or is stopped, the control solenoid is put into the mode A to introduce oil into the control pressure chamber so that the hydraulic pressure of the oil moves the piston toward the control pressure chamber to suppress opening of the check valve; and immediately after the command for restarting the engine is issued, the control solenoid is put into the mode C to discharge the high hydraulic pressure of the control pressure chamber so that the check valve is open by the repulsive force of the opening compression spring to open the oil discharge path.

A fifth embodiment of the present invention solves the problems by the hydraulic control apparatus according to the fourth embodiment, in which a cylindrical hollow portion formed in the piston receives an end of the opening compression spring, or a small-diameter convex portion formed at an end of the piston is inserted into the opening compression spring.

A sixth embodiment of the present invention solves the problems by the hydraulic control apparatus according to the fourth embodiment, in which the check valve is formed of a push-back valve body and a compression biasing spring that biases the push-back valve body in a direction opposite to a direction in which oil flows into the accumulator, an end of the balance valve body present in the reference pressure chamber is formed as a protrusion and comes into contact with the push-back valve body, and the push-back valve body has a greater hardness than the protrusion.

A seventh embodiment of the present invention solves the problems by a hydraulic control method for a hydraulic control apparatus including: a branch path that branches from a main passage that connects an oil pump that operates with rotation of an engine and equipment to which oil is supplied by the oil pump; an accumulator connected to the branch path; a control solenoid; a reference pressure chamber and a control pressure chamber; and a balance valve unit including a balance valve body and an opening compression spring that biases the balance valve body toward an opening side, the method including: providing a check valve for preventing backflow in an oil inlet path of the branch path, through which oil flows into the accumulator; providing the balance valve unit in an oil discharge path of the branch path, through which oil is discharged from the accumulator; and operating the control solenoid to introduce a high-pressure oil into the control pressure chamber such that opening of the balance valve body is suppressed by a hydraulic pressure of the high-pressure oil.

An eighth embodiment of the present invention solves the problems by the hydraulic control method according to the seventh embodiment, in which the equipment to which the oil is supplied is a transmission. A ninth embodiment of the present invention solves the problems by the hydraulic control method according to the seventh or eighth embodiment, in which the control solenoid is an electromagnetic control valve which has three oil input/output ports for paths A, B, and C and is switched between a mode A in which the paths B and A are connected and the paths B and C are disconnected and a mode C in which the paths B and C are connected and the paths B and A are disconnected, the path A of the control solenoid, the reference pressure chamber, and a downstream side of the check valve of the oil inlet path are connected directly or via the accumulator, and the control pressure chamber and the path B of the control solenoid are connected, when the oil pump performs a pressurization operation or is stopped, the control solenoid is put into the mode A to introduce high-pressure oil into the control pressure chamber so that opening of the balance valve body is suppressed by the hydraulic pressure of the high-pressure oil to close the oil discharge path, and immediately after a command for restarting the engine is issued, the control solenoid is put into the mode C to discharge the high-pressure oil to decrease the hydraulic pressure of the control pressure chamber so that the balance valve body is positioned on the opening side by a repulsive force of the opening compression spring to open the oil discharge path.

A tenth embodiment of the present invention solves the problems by the hydraulic control method according to the ninth embodiment, in which the hydraulic control apparatus includes a controller that controls the control solenoid, a present flag and a past flag that record an operation and stopping state of the engine or the oil pump are provided in a memory of the controller, the past flag is bit-set in advance, and the control solenoid is set to the mode A in advance, the present flag is updated every time an operation of the engine or the oil pump is checked, the present flag is bit-set when the engine or the oil pump is operating, and the present flag is bit-reset when the engine or the oil pump is stopped, when the past flag is bit-reset and the present flag is bit-set, the control solenoid is put into the mode C to open the discharge path, when the past flag is not bit-reset and the present flag is not bit-set, the control solenoid is set to the mode A to close the discharge path, and the past flag is updated with the content of the present flag before the operation of the engine or the oil pump is checked again.

In the present invention, the hydraulic pressure of the control pressure chamber is controlled by the control solenoid to open the balance valve unit to control discharge of oil in the accumulator. Therefore, a solenoid valve having a smaller effective cross-sectional area than controlling the oil in the accumulator directly using a solenoid valve can be used as the control solenoid. Therefore, it is possible to reduce the size of the solenoid valve and to manufacture a compact hydraulic control apparatus at a low cost.

BRIEF DESCRIPTION OF THE DRAWINGS

FIGS. 1A to 1C illustrate a first embodiment of a hydraulic control apparatus of the present invention, in which FIG. 1A is a diagram illustrating a hydraulic pressure state during a normal operation of an oil pump, FIG. 1B is a diagram illustrating a hydraulic pressure state during idling stop, and FIG. 1C is a diagram illustrating a hydraulic pressure state immediately after an engine restart command is issued;

FIG. 3 is a table illustrating the relation among an engine operation state, a mode of a control solenoid, a connection/disconnection state of the control solenoid, a hydraulic pressure difference between a reference pressure chamber and a control pressure chamber, and a closed/open state of a discharge path by a balance valve unit (BBU) according to the hydraulic control apparatus of the present invention;

FIGS. 5A to 5D illustrate a second embodiment of a hydraulic control apparatus of the present invention, in which FIG. 5A is a diagram illustrating a hydraulic pressure state during a normal operation of an oil pump, FIG. 5B is a diagram illustrating a hydraulic pressure state during idling stop, FIG. 5C is a diagram illustrating a hydraulic pressure state immediately after the oil pump restarts, and FIG. 5D is a diagram illustrating another example of a balance valve body provided in a balance valve unit (BBU);

FIGS. 6A to 6C illustrate a third embodiment of the hydraulic control apparatus of the present invention, in which FIG. 6A is a diagram illustrating a hydraulic pressure state during a normal operation of an oil pump, FIG. 6B is a diagram illustrating a hydraulic pressure state during idling stop, and FIG. 6C is a diagram illustrating a hydraulic pressure state immediately after an engine restart command is issued; and FIGS. 7A to 7C illustrate an example of a conventional hydraulic control apparatus, in which FIG. 7A is a diagram illustrating a hydraulic pressure state during a normal operation of an oil pump, FIG. 7B is a diagram illustrating a hydraulic pressure state during idling stop, and FIG. 7C is a diagram illustrating a hydraulic pressure state immediately after an engine restart command is issued.

DESCRIPTION OF THE PREFERRED EMBODIMENTS

First Embodiment

Figure 2:
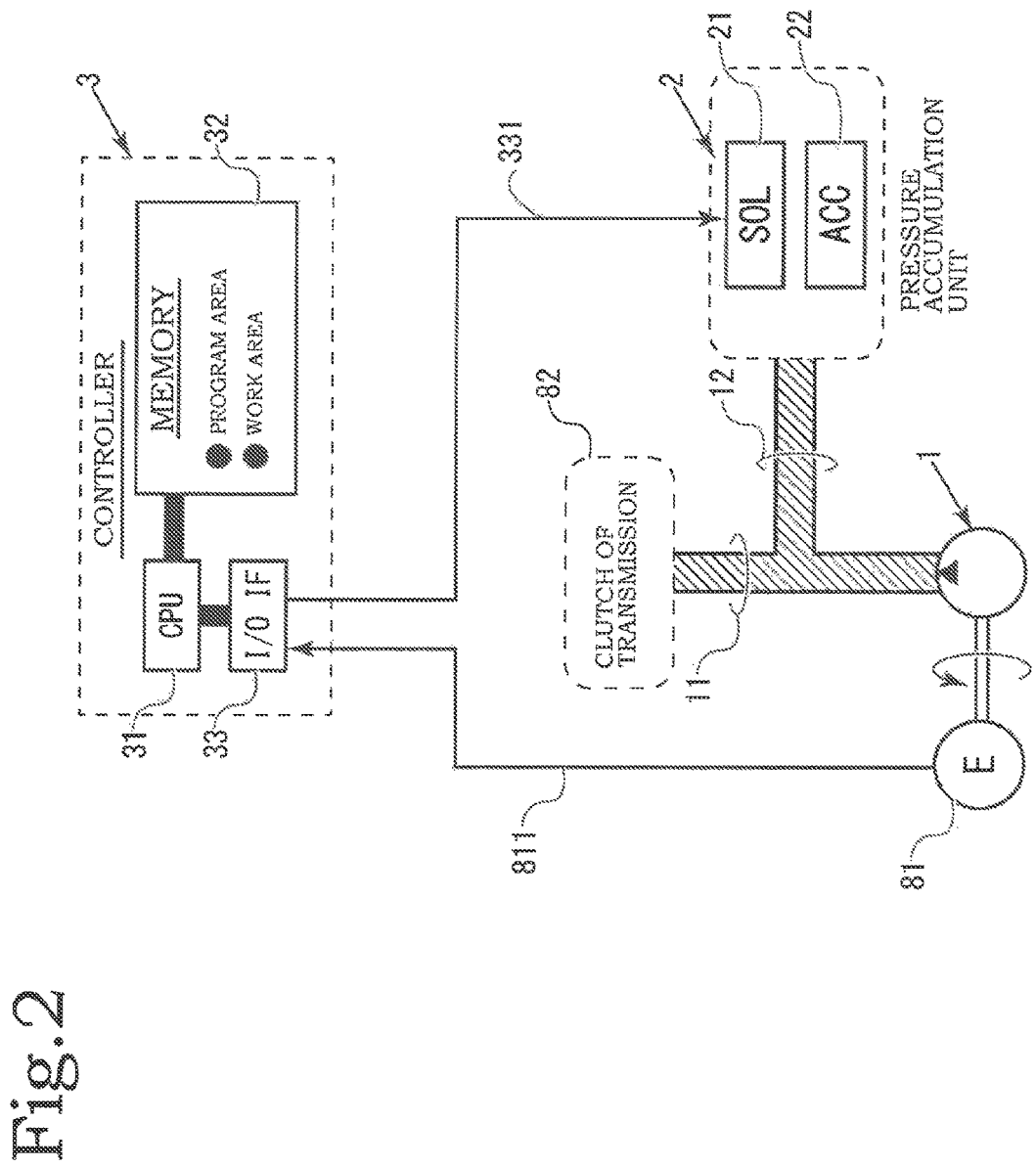
FIG. 2 is a block diagram of the hydraulic control apparatus of the present invention.

Embodiments will be described by way of an example of a hydraulic control apparatus according to the present invention with reference to FIGS. 1A to 1C to FIGS. 6A to 6C. FIG. 2 is a block diagram of the hydraulic control apparatus of the present invention. The hydraulic control apparatus of the present invention includes an oil pump 1 that operates with rotation of an engine 81, a main passage 11 that delivers oil to which a hydraulic pressure created by the oil pump 1 is applied to a transmission 82, a pressure accumulation unit 2 provided at the distal end of a branch path 12 between the oil pump 1 and the transmission 82, and a controller 3 that controls a control solenoid 21 included in the pressure accumulation unit 2. An accumulator 22 is also included in the pressure accumulation unit 2.

The controller 3 includes a CPU 31, a memory 32, and an I/O interface 33. These elements are electrically connected by a data bus. The memory 32 has a program area that retains a program for causing the CPU to perform an arithmetic operation and a work area necessary for an arithmetic process. The I/O interface 33 is an interface for at least inputting a state signal 811 of the engine 81 or the oil pump 1 indicating a normal operation state, an idling stop state, and a restart timing of the engine 81 or the oil pump 1 to the CPU 31 and outputting a control signal 331 for controlling the control solenoid 21. Moreover, the control solenoid 21 is an electromagnetic control valve that controls opening/closing of an electromagnetic valve.

FIGS. 1A to 1C illustrate the first embodiment of the hydraulic control apparatus of the present invention, in which FIG. 1A is a diagram illustrating a configuration of the hydraulic control apparatus and a hydraulic pressure state during a normal operation of the oil pump, FIG. 1B is a diagram illustrating the configuration and a hydraulic pressure state during idling stop, and FIG. 1C is a diagram illustrating the configuration, the engine, and a hydraulic pressure state immediately after an engine restart command is issued. However, the engine 81 and the controller 3 are not depicted.

In the following description, a passage being connected means that a pipe as the passage is bonded, and a passage being communicated means a state in which oil circulates smoothly without being closed by a valve body or the like. Moreover, hatched portions of the accumulator 22, the main passage 11, the branch path 12, an inlet path 121, a discharge path 122, a reference pressure chamber 41, and a control pressure chamber 42 are regions in which a high hydraulic pressure is maintained by the oil accumulated in the oil pump or the accumulator 22. The high hydraulic pressure is approximately P. Moreover, a low hydraulic pressure is approximately P0.

A configuration of the first embodiment of the hydraulic control apparatus of the present invention will be described with reference to FIGS. 1A to 1C. The hydraulic control apparatus is a hydraulic control apparatus including an oil pump 1 that operates with the rotation of an engine 81, a main passage 11 that connects the oil pump 1 and a transmission 82, and an accumulator 22 that is connected to a branch path 12 that branches from the main passage 11. The branch path 12 is formed of an inlet path 121 (an inlet upstream path 121*a* and an inlet downstream path 121*b*) and a discharge path 122 (a discharge upstream path 122*a* and a discharge downstream path 122*b*). The pressure accumulation unit 2 is formed of the accumulator 22, the inlet path 121 including a check valve 5, the discharge path 122 including a balance valve unit 4 (hereinafter referred to as a BBU 4), and a control solenoid 21. In the drawing, the pressure of the hatched passage is a high pressure and is approximately P. Moreover, the pressure of a non-hatched passage is a low pressure and is approximately P0.

The check valve 5 is a valve that prevents backflow of oil. For example, the check valve 5 may be configured such that the passage is closed by a push-back valve body 51 (see FIG. 1B) biased by a compression biasing spring 52 in a reverse direction of the forward direction of the oil flow. With this configuration, when oil flows backward, the push-back valve body 51 blocks the passage to prevent backflow. As for oil flowing in the forward direction, if a hydraulic pressure that generates stronger force than the sum of a hydraulic pressure on the downstream side of the push-back valve body 51 and a repulsive force (g) of the compression biasing spring 52 is applied, it is possible to secure a passage (see FIG. 1B). Although the push-back valve body 51 is depicted as a spherical member in FIGS. 1A to 1C, the present invention is not limited to this.

In this example of the hydraulic control apparatus, the inlet path 121 and the discharge path 122 converge and are then are connected to the accumulator 22. More specifically, the inlet path 121 and the discharge path 122 are connected to the accumulator 22 in a converged state. Moreover, the inlet path 121 is also referred to as an oil inlet path and the discharge path 122 is also referred to as an oil discharge path. The inlet downstream path 121*b* and the discharge upstream path 122*a* may be connected to the accumulator 22 separately. Oil pressurized by the oil pump 1 flows into the accumulator 22 via the main passage 11 and the inlet path 121. With this pressure, a piston 222 moves in a direction of increasing the volume of the accumulator 22 and compresses an accumulation compression spring 221. Pressure is accumulated in the accumulator 22 as the repulsive force of the accumulation compression spring 221.

The inlet path 121 and the discharge path 122 are present between the accumulator 22 and the main passage 11. In relation to the check valve 5 provided in the middle of the inlet path 121, a portion of the inlet path 121 close to the accumulator 22 is referred to as an inlet downstream path 121*b*, and a portion of the inlet path 121 close to the main passage 11 is referred to as an inlet upstream path 121*a* (see FIG. 1B). Moreover, in relation to the BBU 4 provided in the middle of the discharge path 122, a portion of the discharge path 122 close to the accumulator 22 is referred to as a discharge upstream path 122*a*, and a portion of the discharge path 122 close to the main passage 11 is referred to as a discharge downstream path 122*b*.

The BBU 4 includes a reference pressure chamber 41 and a control pressure chamber 42 and a balance valve body 43 is incorporated therein. The control solenoid 21 has paths A, B, and C which are input/output ports of oil. The control solenoid 21 can be switched at least in two modes of a mode A in which the paths B and A are connected and the paths B and C are disconnected and a mode C in which the paths B and A are disconnected and the paths B and C are connected by the control of the controller 3. The controller 3 operates the control solenoid 21 to increase or decrease the hydraulic pressure of the control pressure chamber 42. For example, the control solenoid 21 may be put into the mode A so that the paths B and A are connected and the paths B and C are disconnected whereby high-pressure oil can be introduced into the control pressure chamber 42.

The control solenoid 21 may be put into the mode C so that the paths B and C are connected and the paths B and A are disconnected whereby the high-pressure oil in the control pressure chamber 42 can be discharged. The balance valve body 43 is biased by the opening compression spring 433*c* so as to move to a position at which the BBU 4 is open. The high-pressure oil introduced into the control pressure chamber 42 acts in such a way that the balance valve body 43 is moved to a closed side (that is, toward the reference pressure chamber 41). This suppresses opening of the balance valve body 43.

Specifically, the accumulator 22, the downstream side of the check valve 5, the reference pressure chamber 41 and the path A of the control solenoid 21 are connected to each other. Moreover, the control pressure chamber 42 is connected to the path B of the control solenoid 21. The distal end of the path C of the control solenoid 21 is connected to an oil return 83. The upstream side of the oil pump 1 (that is, a return passage from the transmission 82) is also connected to the oil return 83. It can be regarded that the hydraulic pressure pressurized by the oil pump 1 is not present in the passage connected to the oil return 83. Even when oil is present in the passage connected to the oil return 83, the pressure thereof is as low as P0.

With this configuration, the hydraulic pressure of the reference pressure chamber 41 is normally identical to the hydraulic pressure of the accumulator 22. On the other hand, the hydraulic pressure of the control pressure chamber 42 can be controlled by selecting the state of the control solenoid 21 to the mode A or C. First, when the control solenoid 21 is put into the mode A, in principle, the hydraulic pressure of the control pressure chamber 42 becomes equal to the hydraulic pressure of the reference pressure chamber 41 through the paths A and B. On the other hand, when the control solenoid 21 is put into the mode C, the paths B and A are disconnected and the paths B and C are connected whereby the hydraulic pressure of the control pressure chamber 42 is discharged and becomes low hydraulic pressure in relation to the reference pressure chamber 41. In this manner, by operating the control solenoid 21, the hydraulic pressure of the control pressure chamber 42 can be controlled to be high pressure or low pressure. For example, the hydraulic pressure can be controlled to be high hydraulic pressure P and low hydraulic pressure P0.

First Embodiment: During Normal Operation of Oil Pump

First, an operation during a normal operation of the oil pump 1 (that is, when the oil pump 1 operates and applies pressure to oil) will be described with reference to FIG. 1A. During the normal operation of the oil pump 1, the control solenoid 21 is put into the mode A. With this control, high-pressure oil is introduced into the control pressure chamber 42, and the hydraulic pressure of the control pressure chamber 42 becomes substantially the same as the hydraulic pressure of the reference pressure chamber 41. Although the balance valve body 43 is inserted so as to be movable between the reference pressure chamber 41 and the control pressure chamber 42, the balance valve body 43 is sealed by an O-ring 432 so that the mutual oils do not mix together.

The hydraulic pressures of the reference pressure chamber 41 and the control pressure chamber 42 are P. The force that moves the balance valve body 43 toward the reference pressure chamber 41 originates from the hydraulic pressure P of the control pressure chamber 42 and is force Fb associated with a surface 431b. When the effective cross-sectional area of this surface 431b is Sb, Fb=P×Sb. On the other hand, the force that moves the balance valve body 43 in a reverse direction originates from the repulsive force G of the opening compression spring 433c and the hydraulic pressure P of the reference pressure chamber 41 and is force Fa associated with a surface 431a. When the effective cross-sectional area of the surface 431a is Sa, Fa=P×Sa. The force that moves the balance valve body 43 toward the control pressure chamber is a resultant force of G and Fa and is G+Fa=G+P×Sa.

As illustrated in FIG. 1A, in order to compress the opening compression spring 433c to maintain a state in which the balance valve body 43 is moved toward the reference pressure chamber 41, it is necessary to satisfy a relation of G+P×Sa<P×Sb. From this expression, the effective cross-sectional area Sb of the surface 431b needs to be sufficiently larger than the effective cross-sectional area Sa of the surface 431a. That is, the area Sb needs to be sufficiently larger than the area Sa so that it is possible to resist the repulsive force G. When this condition is satisfied, the balance valve body 43 can remain at a position for closing the BBU 4 due to the force corresponding to Fb−Fa−G=P×(Sb−Sa)−G. As a result, the closed state of the discharge path 122 is maintained.

On the other hand, since the oil pressurized by the oil pump 1 presses and moves the spherical push-back valve body 51 of the check valve 5, an inlet area for the inlet path 121 is secured. With this configuration, oil flows into the accumulator 22 up to an upper-limit pressure and is accumulated therein. A mark "x" on the path "C" of the control solenoid 21 indicates that the path C is disconnected from the path B.

First Embodiment: During Idling Stop

Next, an operation during idling stop will be described with reference to FIG. 1B. Since a pressurization operation of the oil pump 1 stops when the engine stops temporarily, in principle, the hydraulic pressure in the main passage 11 decreases toward the atmospheric pressure. The repulsive force of the compression biasing spring 52 and force resulting from the pressure in the accumulator 22 act on the check valve in such a way that the inlet path 121 is closed. The control solenoid 21 is controlled in the same manner as during the normal operation of the oil pump so that the paths A and B are connected and the path C is disconnected. Due to this, the hydraulic pressure of the control pressure chamber 42 is maintained equivalent to the hydraulic pressure of the reference pressure chamber 41, and the closed state of the discharge path 122 is maintained by the operation of the balance valve body 43. As a result, the oil accumulated in the accumulator 22 during the normal operation of the oil pump is retained in the accumulator 22 together with pressure. The mark "x" on the path "C" of the control solenoid 21 indicates that the path C is disconnected from the path B.

First Embodiment: Immediately after Command for Restarting Engine is Issued

Next, an operation immediately after a command for restarting the engine 81 is issued will be described with reference to FIG. 1C. Although the oil pump 1 also restarts when the engine restarts, the hydraulic pressure of the main passage 11 does not increase immediately after several hundreds of milliseconds from the start command. In this case, the controller 3 puts the control solenoid 21 into the mode C so that the path A is disconnected from the path B and the paths B and C are connected. As a result, the high-pressure oil of the control pressure chamber 42 is discharged to the oil return 83.

The force components G and Fa become dominant among the force components acting on the balance valve body 43, the balance valve body 43 moves toward the control pressure chamber 42, and the BBU 4 is open. With this operation, the discharge downstream path 122b is open. As a result, the high-pressure oil accumulated in the accumulator 22 is discharged to the main passage 11 through the open discharge path 122 to compensate for the deficient pressurization by the oil pump 1. A mark "x" on the path "A" of the control solenoid 21 indicates that the path A is disconnected from the path B.

First Embodiment: During Normal Operation of Oil Pump Again

The above-mentioned operations are performed for a period of several hundreds of milliseconds after a command for restarting the engine 81 is issued. After that, pressurized oil is supplied by the oil pump 1, and a state during the normal operation of the oil pump 1 is created. In this case, the control solenoid 21 is put into the mode A by the control of the controller 3. That is, the path B is disconnected from the path C and is connected to the path A. As a result, the force Fb that moves the balance valve body 43 toward the reference pressure chamber 41 becomes dominant and the balance valve body 43 closes the BBU 4. In this way, the discharge downstream path 122b is closed. By doing so, the state during the normal operation of the oil pump 1 as illustrated in FIG. 1A is created and the oil pressurized by the oil pump 1 is accumulated in the accumulator 22 through the inlet path 121.

First Embodiment: Process Flow of Controller

Next, the process of the controller 3 for performing the above-described operations will be described. As described above, the controller 3 includes the CPU 31 and the CPU 31 controls the control solenoid 21 according to the process flow illustrated in FIG. 4. When a switch of an electric system of an automobile is connected, the controller 3 also starts operating. In order to prevent malfunction during power-on, a "past flag" related to the operation of an engine or a pump is bit-set (Step 1). The "past flag" is a flag that records a state whether the engine is operating or is stopped, and at least one bit corresponding to a bit-set and a reset may be secured in a work area of the memory 32.

The "past flag" being bit-set is a flag indicating that the engine 81 or the oil pump 1 was operating when the operation state thereof was checked. However, it is assumed that the past flag is bit-set for the sake of convenience for initial setting. Moreover, the control solenoid 21 is put into the mode A. That is, the paths B and A are connected and the paths B and C are disconnected (Step 2). With this operation, the hydraulic pressure of the control pressure chamber 42 becomes identical to the hydraulic pressure of the reference pressure chamber 41. After that, other necessary initial setting is performed (Step 3).

The power of the controller is checked (Step 4). If the power is off (Step 5), a determination result of "True" is output and the flow ends. If the power is not off, a determination result of "False" is output and the flow proceeds to Step 6.

It is checked whether the engine 81 is operating or is stopped on the basis of an engine state signal 811. A "present flag" related to an engine operation is bit-set when the engine is operating and is reset when the engine is stopped. Similarly to the "past flag," at least one bit of the "present flag" corresponding to a set and a reset may be secured in the work area of the memory 32 (Step 6). Subsequently, it is checked whether the "past flag" is set or reset (Step 7).

By referring to the "past flag" and the "present flag," it is checked whether "the past flag is reset" and "the present flag is set" (Step 8). When a determination result is "True," the flow proceeds to Step 9. In other cases, a determination result of "False" is output and the flow proceeds to Step 10. Step 8 is an example of a process of detecting the state immediately after an engine restart command is issued.

When a determination result of "True" is obtained in Step 8, since the oil pump is in the state immediately after the engine restart command is issued, the flow proceeds to Step 9 and the control solenoid 21 is put into the mode C. That is, the path B is disconnected from the path A, and the paths B and C are connected. As a result, the high-pressure oil in the control pressure chamber 42 is discharged through the path C and the hydraulic pressure of the control pressure chamber 42 decreases. Therefore, the balance valve body 43 releases the closed state of the discharge path 122. As a result, the high-pressure oil accumulated in the accumulator 22 is discharged to the main passage 11.

On the other hand, when a determination result of "False" is obtained in Step 8, since the oil pump is during the normal operation or during idling stop, the flow proceeds to Step 10 and the mode A of the control solenoid 21 is maintained. That is, the path B is disconnected from the path C and the paths B and A are connected. With this operation, the closed state of the discharge path 122 is maintained.

The process of Step 10 is performed during the normal operation and the idling stop of the oil pump 1. That is, the closed state of the discharge path 122 is maintained and the inlet path 121 is controlled by the check valve 5. During the normal operation of the oil pump 1, the push-back valve body 51 of the check valve 5 is moved toward the downstream side by the force corresponding to the hydraulic pressure of the main passage 11 by the operation of the oil pump 1 whereby oil flows into the accumulator 22. During idling stop, since the hydraulic pressure of the main passage 11 and the inlet upstream path 121*a* decreases due to the stopping of the oil pump 1, the inlet path 121 is also closed and the pressure accumulation and the oil in the accumulator 22 is maintained.

Figure 4:
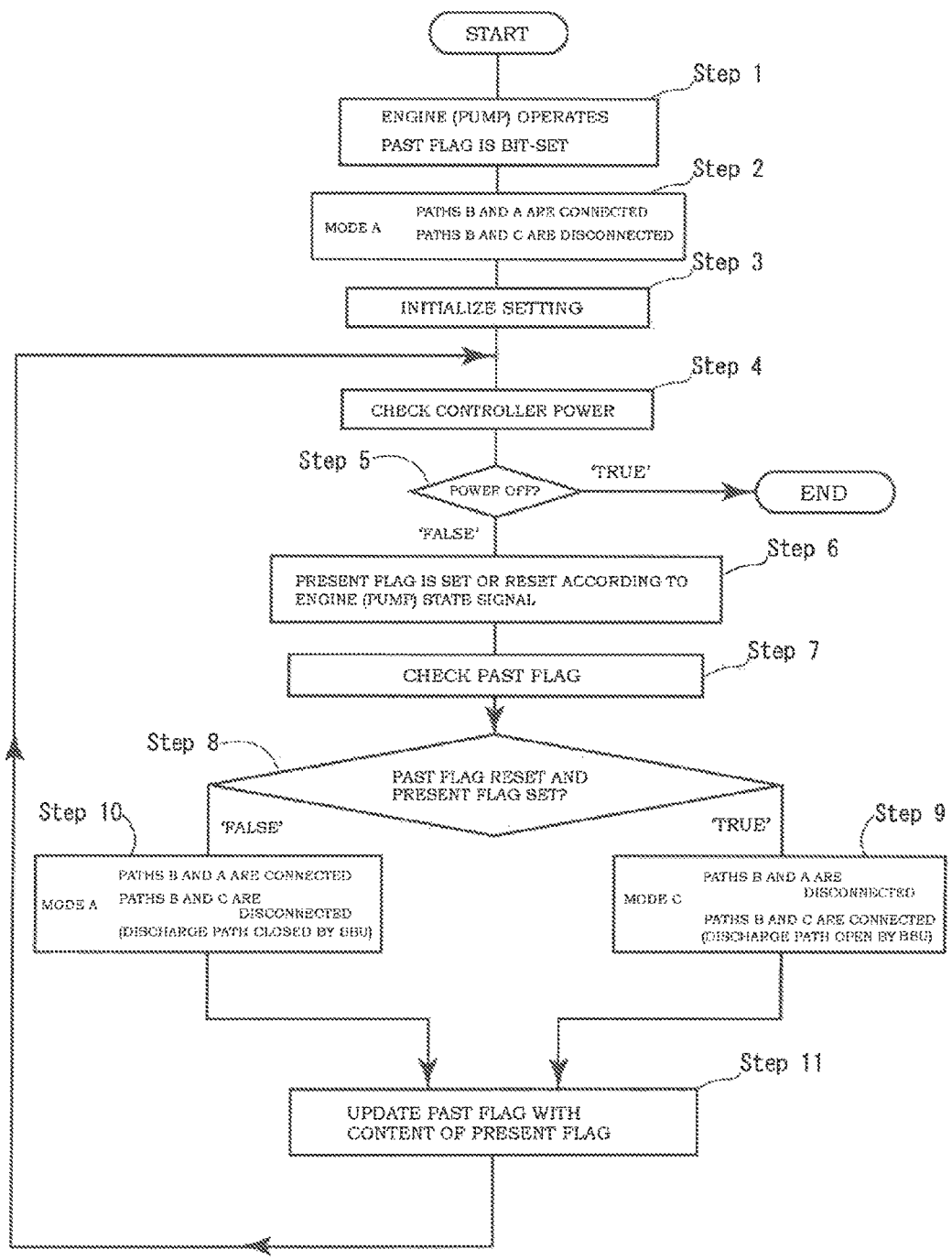
FIG. 4 illustrates an example of the flow processed by a CPU that forms a controller according to the hydraulic control apparatus of the present invention.

After Step 9 or Step 10 is executed, the "past flag" is updated with the value of the "present flag" in Step 11 and the flow returns to Step 4 to check the power of the controller. After that, Steps 4 to 11 are repeated until the power of the controller 3 is turned off. The flowchart illustrated in FIG. 4 illustrates basic processes, and a standby process for adjusting time such as securing time until the discharge of the oil accumulated in the accumulator 22 is completed may be inserted between Steps 4 to 11.

FIG. 3 illustrates the relation among an engine operation state, a mode and a passage connection state of the control solenoid 21, a hydraulic pressure difference between the reference pressure chamber 41 and the control pressure chamber 42, and the closed/open state of the discharge path 122 by the BBU 4. First, the operation state of the oil pump on the left column includes three states during the normal operation and the idling stop, and immediately after the engine restart command of the oil pump 1.

Among these states, the control solenoid 21 during the normal operation and the idling stop of the oil pump 1 is put into the mode A by the controller 3 so that the paths B and A are connected and the paths B and C are disconnected. Due to this, the hydraulic pressure difference between the reference pressure chamber 41 and the control pressure chamber 42 becomes zero or decreases. By doing so, as described above, the force Fb that moves the balance valve body 43 toward the closed side becomes dominant and the discharge path 122 is closed. This suppresses opening of the balance valve body 43.

Immediately after the engine restart command is issued, the control solenoid 21 is put into the mode C by the controller 3. That is, the paths B and A are disconnected and the paths B and C are connected. Due to this, the hydraulic pressure of the control pressure chamber 42 decreases and the hydraulic pressure difference between the control pressure chamber 42 and the reference pressure chamber 41 increases. By doing so, the balance valve body 43 enters into an open state by the repulsive force G of the opening compression spring 433*c*. As a result, the discharge path 122 is open.

The BBU 4 according to the first embodiment moves the balance valve body 43 to close and open the discharge path 122 using the repulsive force G of the opening compression spring 433*c* and the difference in the force resulting from the hydraulic pressure difference between the reference pressure chamber 41 and the control pressure chamber 42. For example, the volume of the control pressure chamber 42 is set to be ⅕ of the volume of the accumulator 22. By doing so, the control solenoid 21 can be configured using an electromagnetic valve having an effective cross-sectional area which is ⅕ of the effective cross-sectional area of the BBU 4 that discharges high-pressure oil to the accumulator 22. That is, a valve having an effective cross-sectional area which is five times that of a solenoid can be controlled using the solenoid (the control solenoid 21) having a small cross-sectional area.

Second Embodiment

Next, a second embodiment of the hydraulic control apparatus according to the present invention will be described with reference to FIGS. 5A to 5D. The transmission 82, the oil return 83, and the oil pump 1 have the same configuration as those of the first embodiment and are not depicted in the drawing and the description thereof will be omitted. In the hydraulic control apparatus, the inlet downstream path 121b which is on the downstream side of the inlet path 121 also serves as the discharge upstream path 122a which is on the upstream side of the discharge path 122, and the inlet upstream path 121a which is on the upstream side of the inlet path 121 also serves as the discharge downstream path 122b which is on the downstream side of the discharge path 122.

The inlet path 121 having the check valve 5 is incorporated into a reference pressure chamber 41D. Moreover, a balance valve body 43D passes through an insertion hole 46D which is formed between a reference pressure chamber 41D and a control pressure chamber 42D. An O-ring 432 is provided in a lateral portion of the balance valve body 43D so that the reference pressure chamber 41D and the control pressure chamber 42D are isolated from each other and the mutual oils do not mix together.

The inlet downstream path 121b (the discharge upstream path 122a) is connected to the accumulator 22, the reference pressure chamber 41D, and the path A of the control solenoid 21. Moreover, the control pressure chamber 42D is connected to the path B of the control solenoid 21. Here, in the control pressure chamber 42D the high-pressure oil flowing therein acts on a control pressure chamber-side cross-section 431b whereby a passage connected to the path B is attached to such a position that the balance valve body 43D can be moved toward the control pressure chamber 42D.

Moreover, an end of the balance valve body 43D close to the reference pressure chamber 41D is formed as a narrow columnar protrusion and comes into contact with the push-back valve body 51. On the other hand, a piston 434D is provided at an end of the balance valve body 43D close to the control pressure chamber 42D. The piston 434D is disposed in the control pressure chamber 42D and is configured to receive the hydraulic pressure of the oil in the control pressure chamber 42D.

An opening compression spring 433c is provided between the piston 434D and an inner wall of the control pressure chamber 42D. The balance valve body 43D is moved toward the reference pressure chamber 41D by the repulsive force G of the opening compression spring 433c and the push-back valve body 51 of the check valve 5 is open. When the push-back valve body 51 of the check valve 5 is open, the discharge path 122 (122a and 122b) is open and the oil accumulated in the accumulator 22 can be discharged to the main passage 11.

The check valve 5 is biased toward a side on which the check valve 5 is closed by the hydraulic pressure P in the reference pressure chamber 41D and the repulsive force g of the compression biasing spring 52 that biases the push-back valve body 51. A surface of the push-back valve body 51 to which pressure is applied is referred to as a reference pressure chamber-side cross-section 431a and the effective cross-sectional area thereof is Sa. In this case, the force that closes the check valve 5 is the repulsive force g and the force Fa based on the hydraulic pressure P. That is, Fa+g=P×Sa+g.

Second Embodiment: During Normal Operation of Oil Pump

FIG. 5A illustrates the state during the normal operation of the oil pump 1. In this case, the control solenoid 21 is in the mode A. By doing so, since the paths B and A are connected and the path C is disconnected, oil having approximately the same hydraulic pressure P as the reference pressure chamber 41D can be accumulated in the control pressure chamber 42D. The hydraulic pressure of the oil acts as a force that moves the balance valve body 43D toward the control pressure chamber 42D while resisting against the repulsive force G of the opening compression spring 433c.

On the other hand, when the oil pump 1 performs a normal operation and sufficiently pressurized oil acts on the inlet upstream path 121a, the check valve 5 is open and the pressurized oil flows into the reference pressure chamber 41D and is accumulated in the accumulator 22 through the inlet downstream path 121b (also serving as the discharge upstream path 122a). A mark "x" on the path "C" of the control solenoid 21 indicates that the path C is disconnected from the path B.

Second Embodiment: During Idling Stop

Next, the state when the oil pump 1 stops with temporarily stopping of the engine will be described with reference to FIG. 5B. The control solenoid 21 is still in the mode A, and oil having the hydraulic pressure P is accumulated in the control pressure chamber 42D. When the effective cross-sectional area of the control pressure chamber-side cross-section 431b on which the hydraulic pressure P acts is Sb, and the force that moves the balance valve body 43D toward the control pressure chamber 42D is Fb=P×Sb.

This force prevents opening of the check valve 5 while resisting against the repulsive force G of the opening compression spring 433c and the closed state of the check valve 5 is maintained. Due to this, even when the oil pump 1 stops and the hydraulic pressure of the main passage 11 decreases, the oil accumulated in the accumulator 22 is maintained. The force Fb may not be larger than the force G but it is sufficient that the force G is reduced so that the balance valve body 43D cannot be moved toward the reference pressure chamber 41D.

A conditional expression of Sb for realizing this accumulated pressure maintaining operation is calculated as follows. That is, on the left side (the force that closes the check valve 5)=P×Sa+g and the right side ((the force that opens the check valve 5)−(damping force))=G−P×Sb, a condition that opening can be suppressed is that the left side is larger than the right side (that is, P×Sa+g>G−P×Sb). A mark "x" on the path "C" of the control solenoid 21 indicates that the path C is disconnected from the path B.

Second Embodiment: Immediately after Command for Restarting Engine is Issued

FIG. 5C illustrates the operation of the hydraulic control apparatus immediately after a command for restarting the engine 81 is issued. In this state, the control solenoid 21 is put into the mode C. That is, the paths B and A are disconnected and the paths B and C are connected. As a result, the high-pressure oil accumulated in the control pressure chamber 42D is charged to the oil return 83 through the paths B and C. In this way, the hydraulic pressure of the control pressure chamber 42D decreases to P0. Due to this, the force Fb that moves the balance valve body 43D toward the control pressure chamber 42D and results from the hydraulic pressure decreases dramatically from P×Sb to P0×Sb, and the force G that moves the balance valve body 43D toward the reference pressure chamber 41D becomes dominant.

By doing so, the repulsive force G of the opening compression spring 433c opens the check valve 5 (that is, the discharge path 122 (122a and 122b) is open). When the discharge path 122 is open, the oil accumulated in the accumulator 22 is discharged to the main passage 11 to compensate for the deficient pressurization immediately after a command for restarting the engine 81 is issued. A mark "x" on the path "A" of the control solenoid 21 indicates that the path A is disconnected from the path B.

In order to open the check valve 5 using the repulsive force G of the opening compression spring 433c under such a condition, the following conditional expression needs to be satisfied: $G > P \times Sa + P0 \times Sb$ . . . (1). On the other hand, when a high hydraulic pressure P of the control pressure chamber 42D is introduced, the following conditional expression needs to be satisfied: $G < P \times Sa + g + P \times Sb$ . . . (2), and the opening of the check valve 5 needs to be suppressed. The values P, P0, Sa, Sb, g, and G may be set so as to satisfy the conditional expressions (1) and (2). In this condition, the room for selecting G increases and it becomes easy to select G by increasing Sb after providing a small difference between P and P0.

However, when the effective cross-sectional area Sb of the control pressure chamber-side cross-section 431b is increased, the volume of the control pressure chamber 42D increases. When the volume of the control pressure chamber 42D is increased, the effective cross-sectional areas of the paths B and C of the control solenoid 21 need to be increased in order to discharge the high-pressure oil in the control pressure chamber 42D. In this case, the effect of the present invention that the effective cross-sectional area of the valve of the control solenoid 21 can be decreased decreases. Therefore, Sb may be set as small as possible as long as G that satisfies the conditional expressions (1) and (2) can be selected.

In the second embodiment according to the hydraulic control apparatus of the present invention, it is possible to provide a compact hydraulic control apparatus by incorporating the check valve 5 of the inlet path 121 into the reference pressure chamber 41D. Moreover, the balance valve body 43D is moved by the opening compression spring 433c to open the check valve 5 and open the discharge path 122. Therefore, when the discharge path 122 is closed, a minimum amount of high-pressure oil necessary for slightly weakening the repulsive force G of the opening compression spring 433c may be introduced into the control pressure chamber 42D. Therefore, it is possible to further reduce the amount of oil controlled by the control solenoid 21 and to further decrease the effective cross-sectional area of the control solenoid 21.

In the hydraulic control apparatus, the push-back valve body 51 is sealed so that the oil accumulated in the accumulator 22 does not leak toward the main passage 11. Moreover, when the check valve 5 is open, the protrusion of the balance valve body 43D comes into contact with the push-back valve body 51. Here, if an impact dent or the like by the balance valve body 43D is formed on the push-back valve body 51, it is not possible to reliably seal oil. Therefore, by forming the push-back valve body 51 so as to have a greater hardness than at least the protrusion of the balance valve body 43D, it is possible to improve the durability and the reliability of the sealing performance of the check valve 5. In addition, it is possible to improve the durability and the reliability of the hydraulic control apparatus.

Third Embodiment

Next, a configuration of a third embodiment according to the hydraulic control apparatus of the present invention will be described with reference to FIGS. 6A to 6C. The transmission 82, the oil return 83, and the oil pump 1 have the same configuration as those of the first and second embodiments and are not depicted in the drawing and the description thereof will be omitted. In this hydraulic control apparatus, a reference pressure chamber 41E, a control pressure chamber 42E, the control solenoid 21, the accumulator 22, and the passages connecting these components have the same configuration as those of the second embodiment.

Moreover, the reference pressure chamber 41E, the control pressure chamber 42E, and a balance valve body 43E have the same configuration as those of the second embodiment. That is, the portion of the inlet path 121 having the check valve 5 is incorporated into the reference pressure chamber 41E. Moreover, the balance valve body 43E is inserted through an insertion hole 46E that is formed between the reference pressure chamber 41E and the control pressure chamber 42E. An O-ring 432 is provided in a lateral portion of the balance valve body 43E so that the reference pressure chamber 41E and the control pressure chamber 42E are isolated from each other and the mutual oils do not mix together.

Furthermore, an end of the balance valve body 43E close to the reference pressure chamber 41E is formed as a narrow cylindrical protrusion and comes into contact with the push-back valve body 51. A piston 434E is provided at an end of the balance valve body 43E close to the control pressure chamber 42E. The piston 434E is disposed in the control pressure chamber 42E and is configured to receive the hydraulic pressure in the control pressure chamber 42E. A cylindrical hollow portion 434a is formed in the piston 434E and the opening compression spring 433c is fitted into the hollow portion 434a.

The other end of the opening compression spring 433c is in contact with the inner wall of the control pressure chamber 42E. With this configuration, when the opening compression spring 433c exerts the repulsive force G, the balance valve body 43E performs an operation of opening the check valve 5 incorporated into the reference pressure chamber 41E. When the push-back valve body 51 of the check valve 5 is open, the discharge path 122 (also serving as the inlet path 121) is open and the oil accumulated in the accumulator 22 can be discharged to the main passage 11.

Here, the force necessary for opening the check valve 5 is the same as that described in the second embodiment. That is, the check valve 5 is biased toward the closing side by the hydraulic pressure P in the reference pressure chamber 41E and the repulsive force g of the compression biasing spring 52 that biases the push-back valve body 51. A surface of the push-back valve body 51 to which pressure is applied is referred to as a reference pressure chamber-side cross-section 431a and the effective cross-sectional area thereof is Sa. In this case, the force that closes the check valve 5 is the repulsive force g and the force Fa based on the hydraulic pressure.

That is, $Fa + g = P \times Sa + g$. Furthermore, even when the hydraulic pressure in the control pressure chamber 42E is decreased to P0, $P0 \times Sb$ also acts as the force that closes the check valve 5. Therefore, in order to open the check valve 5 while resisting against these forces, the repulsive force G of the opening compression spring 433c needs to satisfy a conditional expression of $G > P \times Sa + g + PD \times Sb$. That is, the conditional expressions (1) and (2) need to be satisfied.

Third Embodiment: During Normal Operation of Oil Pump

FIG. 6A illustrates the state during the normal operation of the oil pump 1. In this case, the control solenoid 21 is in the mode A. By doing so, since the paths B and A are connected and the path C is disconnected, oil having approximately the same hydraulic pressure P as the reference pressure chamber 41E can be accumulated in the control pressure chamber 42E. The hydraulic pressure of the oil acts as a force that moves the balance valve body 43E toward the control pressure chamber 42E while resisting against the repulsive force G of the opening compression spring 433c. On the other hand, when the oil pump 1 performs a normal operation and sufficiently pressurized oil acts on the inlet upstream path 121a, the check valve 5 is open and the pressurized oil flows into the reference pressure chamber 41E and is accumulated in the accumulator 22 through the inlet downstream path 121b (also serving as the discharge upstream path 122a). A mark "x" on the path "C" of the control solenoid 21 indicates that the path C is disconnected from the path B.

Third Embodiment: During Idling Stop

Next, the state when the oil pump 1 stops with temporarily stopping of the engine will be described with reference to FIG. 6B. The control solenoid 21 is still in the mode A, and oil having the hydraulic pressure P is accumulated in the control pressure chamber 42E. When the effective cross-sectional area of the control pressure chamber-side cross-section 431b on which the hydraulic pressure P acts is Sb, and the force resulting from the hydraulic pressure P is the force that moves the balance valve body 43E toward the control pressure chamber 42E and is Fb=P×Sb.

This force prevents opening of the check valve 5 while resisting against the repulsive force G of the opening compression spring 433c and the closed state of the check valve 5 is maintained. Due to this, even when the oil pump 1 stops and the hydraulic pressure of the main passage 11 decreases, the oil accumulated in the accumulator 22 is maintained. The force Fb may not be larger than the force G but it is sufficient that the force G is reduced so that the balance valve body 43E cannot be moved toward the reference pressure chamber 41E.

Third Embodiment: Immediately after Command for Restarting Engine is Issued

FIG. 6C illustrates the operation of the hydraulic control apparatus immediately after a command for restarting the engine 81 is issued. In this state, the control solenoid 21 is put into the mode C. That is, the paths B and A are disconnected and the paths B and C are connected. As a result, the high-pressure oil accumulated in the control pressure chamber 42E is charged to the oil return 83 through the paths B and C. In this way, the hydraulic pressure of the control pressure chamber 42E decreases to P0. Due to this, the force Fb that moves the balance valve body 43E toward the control pressure chamber 42E and results from the hydraulic pressure decreases dramatically from P×Sb to P0×Sb, and the force G that moves the balance valve body 43E toward the reference pressure chamber 41E becomes dominant.

The repulsive force G of the opening compression spring 433c satisfies the conditional expression of G>P×Sa+g+P0×Sb and can open the check valve 5. When the check valve 5 is open, the discharge path 122 (122a and 122b) is open, and the oil accumulated in the accumulator 22 is discharged to the main passage 11 to compensate for the deficient pressurization immediately after a command for restarting the engine 81 is issued. A mark "x" on the path "A" of the control solenoid 21 indicates that the path A is disconnected from the path B.

Numerical Example

In this hydraulic control apparatus, the operation during the normal operation (FIG. 6A), idling stop (FIG. 6B), and immediately after a command for restarting the engine 81 is issued (FIG. 6C) will be described when the repulsive force g of the compression biasing spring 52 is 5 (N), Sa is 55 (mm$^2$), the high hydraulic pressure P is 0.8 (N/mm$^2$), the low hydraulic pressure P0 is 0.1 (N/mm$^2$), the repulsive force G of the opening compression spring 433c is 80 (N), and Sb is 75 (mm$^2$), for example.

Numerical Example: During Normal Operation of Oil Pump 1

During the normal operation of the oil pump 1, the following operation is performed. The force that closes the check valve 5 is the repulsive force g of the compression biasing spring 52 and g is 5 (N). On the other hand, the hydraulic pressure of the high-pressure oil generated by pressurization of the oil pump 1 is an inflow hydraulic pressure that exceeds P=0.8 (N/mm$^2$), and the inflow hydraulic pressure is 1.0 (N/mm$^2$). The force originating from the inflow hydraulic pressure applied to the push-back valve body 51 of the check valve 5 is 1.0 (N/mm$^2$)×Sa=1.0 (N/mm$^2$)×55 (m)=55 (N). The force of 55 (N) originating from the inflow hydraulic pressure is sufficiently larger than 5 (N) which is the force that closes the check valve 5 and the force opens the check valve 5 and high-pressure oil is accumulated in the accumulator 22.

When the hydraulic pressure in the accumulator 22 increases up to P=0.8 (N/mm$^2$), the force that closes the check valve 5 is added to the repulsive force g of the compression biasing spring 52, the force applied to the push-back valve body 51 also strengthens with the hydraulic pressure P of the inlet downstream path 121b. This force is P×Sa=0.8 (N/mm$^2$)×55 (mm$^2$)=44 (N). When the repulsive force g of 5 (N) of the compression biasing spring 52 is added, the force is 49 (N). When the difference between the inflow hydraulic pressure of 55 (N) and the force of 49 (N) that closes the check valve 5 decreases, the amount of inflow oil decreases gradually. As a result, oil having the hydraulic pressure P=0.8 (N/mm$^2$) is accumulated in the accumulator 22.

Numerical Example: Idling Stop

Next, the state during idling stop (that is, a pressurization operation of the oil pump 1 stops) will be described. The force that closes the check valve 5 is P×Sa+g=49 (N). On the other hand, the force that moves the balance valve body 43E toward the reference pressure chamber 41E to open the check valve 5 is the repulsive force G (=80 (N)) of the opening compression spring 433c. However, the force originating from the hydraulic pressure that acts on the control pressure chamber-side cross-section 431b of the balance valve body 43E damps the force G.

The hydraulic pressure P (=0.8 (N/mm$^2$)) acts on the control pressure chamber-side cross-section 431b, and the effective cross-sectional area thereof is Sb=75 (mm$^2$). Therefore, the damping force is P×Sb=0.8 (N/mm$^2$)×75 (m)=60 (N). When this damping force is taken into consideration, the force that opens the check valve 5 is 80−60=20

(N). Since this force is smaller than the force 49 (N) that closes the check valve 5, the check valve 5 remains in the closed state. Therefore, the oil accumulated in the accumulator 22 is maintained as it is.

Numerical Example: Immediately after Command for Restarting Engine 81 is Issued Next, the operation immediately after a command for restarting the engine 81 is issued will be described. The high-pressure oil of the control pressure chamber 42E is discharged, and the force originating from the low hydraulic pressure P0 is applied to the control pressure chamber-side cross-section 431b. This force is P0×Sb=0.1 (N/mm$^2$)×75 (m)=7.5 (N). In this way, the force that moves the balance valve body 43E toward the control pressure chamber 42E decreases from 60 (N) to 7.5 (N). Since G=80 (N), even when such a decreased force is taken into consideration, the force that opens the check valve 5 is 72.5 (N). Since this force is larger than the force (49 N) that closes the check valve 5, the check valve 5 is open, the discharge path 122 is open, and the high-pressure oil accumulated in the accumulator 22 is discharged to the main passage 11.

Numerical Example: During Normal Operation of Oil Pump 1 Again

When the oil pump 1 performs a pressurization operation normally again, the control solenoid 21 is also put into the mode A again. In the mode A, the high-pressure oil having the hydraulic pressure P is introduced into the control pressure chamber 42E. In this case, the force that cancels the repulsive force G of the opening compression spring 433c is P×Sb=0.8 (N/mm$^2$)×75 (mm$^2$)=60 (N). By doing so, the opening compression spring 433c cannot open the check valve 5. However, the oil having the inflow hydraulic pressure of 1.0 (N/mm$^2$) opens the check valve 5 and pressure accumulation in the accumulator 22 starts. Hereinabove, an example of the operation of the hydraulic control apparatus when specific numerical values are applied has been described.

The third embodiment according to the hydraulic control apparatus of the present invention has the same effects as the second embodiment. In a manufacturing process of this hydraulic control apparatus, the efficiency of assembling the opening compression spring 433c into the balance valve body 43E increases. That is, the opening compression spring 433c can be assembled into the piston 434E of the balance valve body 43E just by inserting the opening compression spring 433c into the cylindrical hollow portion 434a formed in the piston 434E even when fixing means such as screw clamping or adhesion is not used.

In the hydraulic control apparatus, the push-back valve body 51 is sealed so that the oil accumulated in the accumulator 22 does not leak toward the main passage 11. Moreover, when the check valve 5 is open, the protrusion of the balance valve body 43E comes into contact with the push-back valve body 51. Here, if an impact dent or the like by the balance valve body 43E is formed on the push-back valve body 51, it is not possible to reliably seal oil. Therefore, by forming the push-back valve body 51 so as to have a greater hardness than at least the protrusion of the balance valve body 43E, it is possible to improve the durability and the reliability of the sealing performance of the check valve 5. In addition, it is possible to improve the durability and the reliability of the hydraulic control apparatus.

In the hydraulic control apparatus according to the second embodiment of the present invention, the opening compression spring 433c is formed between the piston 434D and the inner wall of the control pressure chamber 42D (see FIGS. 5A to 5D). Here, a small-diameter convex portion 434b may be provided at an end of the piston 434D and may be inserted in a spiral portion of the opening compression spring 433c (FIG. 5D). By doing so, the opening compression spring 433c can exert the repulsive force appropriately.

Hereinabove, the hydraulic control apparatus and the hydraulic control method according to the present invention have been described on the basis of the example of the accumulator 22 and the balance valve unit 4 that branch from the main passage 11 between the oil pump 1 and the transmission 82. However, the hydraulic control apparatus and the hydraulic control method are not limited to supplying of oil to a transmission but can be broadly applied to equipment such as an engine, a brake, or a steering wheel to which hydraulic pressure needs to be supplied (that is, passages to equipment to which oil is supplied by an oil pump).

In the third embodiment, the solenoid has the modes A and C, and the hydraulic pressure can be controlled by a simple control method of interlocking both modes with the operation state of the oil pump. In the fourth embodiment, by incorporating the check valve of the oil inlet path into the reference pressure chamber, it is possible to provide a compact hydraulic control apparatus. Moreover, the opening compression spring moves the balance valve body to open the check valve and open the oil discharge path. Therefore, even when the hydraulic pressure in the accumulator decreases, the discharge path can be continuously open stably by the repulsive force of the opening compression spring. Moreover, when the oil discharge path is closed, since a minimum amount of oil necessary for slightly weakening the repulsive force of the compression spring may be introduced into the control pressure chamber, it is possible to further reduce the amount of oil controlled by the control solenoid. Therefore, it is possible to further decrease the effective cross-sectional area of the control solenoid.

In the fifth embodiment, in a manufacturing process of the hydraulic control apparatus according to the present invention, it is possible to improve the efficiency of assembling the opening compression spring into the balance valve body. That is, the opening compression spring can be assembled into the piston of the balance valve body just by inserting the opening compression spring into the cylindrical hollow portion formed in the piston even when fixing means such as screw clamping or adhesion is not used. Alternatively, the same can be assembled just by inserting the small-diameter convex portion into the opening compression spring.

In the sixth embodiment, by forming the push-back valve body so as to have a greater hardness than at least the protrusion of the balance valve body, it is possible to improve the durability and the reliability of the sealing performance of the check valve. Moreover, it is possible to improve the durability and the reliability of the hydraulic control apparatus. In the seventh and eighth embodiments, by introducing and discharging high-pressure oil into and from the control pressure chamber, it is possible to control a large amount of high-pressure oil accumulated in the accumulator.

In the ninth embodiment, by switching the mode of the control solenoid, it is possible to control a large amount of high-pressure oil accumulated in the accumulator. In the tenth embodiment, by managing the present flag and the past flag that record the operation and stopping states of the engine or the oil pump, it is possible to appropriately control the switching of the mode of the control solenoid.

What is claimed is:

1. A hydraulic control apparatus comprising:
a branch path that branches from a main passage that connects an oil pump that operates with rotation of an engine and equipment to which oil is supplied by the oil pump;
an accumulator connected to the branch path;
a control solenoid;
a reference pressure chamber and a control pressure chamber; and
a balance valve unit including a balance valve body and an opening compression spring that biases the balance valve body toward an opening side, wherein
a check valve for preventing backflow is provided in an oil inlet path of the branch path, through which oil flows into the accumulator, the balance valve unit is provided in an oil discharge path of the branch path, through which oil is discharged from the accumulator, and the control solenoid is operated to introduce a high-pressure oil into the control pressure chamber such that opening of the balance valve body is suppressed by a hydraulic pressure of the high-pressure oil.

2. The hydraulic control apparatus according to claim 1, wherein
the equipment to which the oil is supplied comprises a transmission.

3. The hydraulic control apparatus according to claim 1, wherein
the control solenoid comprises an electromagnetic control valve which has three oil input/output ports for paths A, B, and C and is switched between a mode A in which the paths B and A are connected and the paths B and C are disconnected and a mode C in which the paths B and C are connected and the paths B and A are disconnected,
the path A of the control solenoid, the reference pressure chamber and a downstream side of the check valve of the oil inlet path are connected directly or via the accumulator, and the control pressure chamber and the path B of the control solenoid are connected,
when the oil pump performs a pressurization operation or is stopped, the control solenoid is put into the mode A to introduce high-pressure oil into the control pressure chamber so that opening of the balance valve body is suppressed by the hydraulic pressure of the high-pressure oil to close the oil discharge path, and
immediately after a command for restarting the engine is issued, the control solenoid is put into the mode C to discharge the high-pressure oil to decrease the hydraulic pressure of the control pressure chamber so that the balance valve body is positioned on the opening side by a repulsive force of the opening compression spring to open the oil discharge path.

4. The hydraulic control apparatus according to claim 3, wherein
in relation to the check valve provided in the middle of the oil inlet path, a portion of the oil inlet path close to the main passage is referred to as an inlet upstream path, and a portion of the oil inlet path close to the accumulator is referred to as an inlet downstream path,
in relation to the balance valve unit provided in the middle of the oil discharge path, a portion of the oil discharge path close to the accumulator is referred to as a discharge upstream path, and a portion of the oil discharge path close to the main passage is referred to as a discharge downstream path,
the inlet downstream path also serves as the discharge upstream path, and the inlet upstream path also serves as the discharge downstream path,
the check valve provided in the oil inlet path is incorporated into the reference pressure chamber, and the balance valve body is inserted through an insertion hole formed between the reference pressure chamber and the control pressure chamber,
an O-ring is provided in a lateral portion of the balance valve body, and the opening compression spring moves the balance valve body toward the reference pressure chamber to open the check valve,
a piston is provided at one end of the balance valve body present in the control pressure chamber and in a vicinity of the end and the piston receives hydraulic pressure to move the balance valve body toward the control pressure chamber,
when the oil pump performs the pressurization operation or is stopped, the control solenoid is put into the mode A to introduce oil into the control pressure chamber so that the hydraulic pressure of the oil moves the piston toward the control pressure chamber to suppress opening of the check valve, and
immediately after the command for restarting the engine is issued, the control solenoid is put into the mode C to discharge the high hydraulic pressure of the control pressure chamber so that the check valve is open by the repulsive force of the opening compression spring to open the oil discharge path.

5. The hydraulic control apparatus according to claim 4, wherein
a cylindrical hollow portion formed in the piston receives an end of the opening compression spring, or a small-diameter convex portion formed at an end of the piston is inserted into the opening compression spring.

6. The hydraulic control apparatus according to claim 4, wherein
the check valve is formed of a push-back valve body and a compression biasing spring that biases the push-back valve body in a direction opposite to a direction in which oil flows into the accumulator,
an end of the balance valve body present in the reference pressure chamber is formed as a protrusion and comes into contact with the push-back valve body, and
the push-back valve body has a greater hardness than the protrusion.

7. A hydraulic control method for a hydraulic control apparatus including:
a branch path that branches from a main passage that connects an oil pump that operates with rotation of an engine and equipment to which oil is supplied by the oil pump;
an accumulator connected to the branch path;
a control solenoid;
a reference pressure chamber and a control pressure chamber; and
a balance valve unit including a balance valve body and an opening compression spring that biases the balance valve body toward an opening side,
the method comprising:
providing a check valve for preventing backflow in an oil inlet path of the branch path, through which oil flows into the accumulator;

providing the balance valve unit in an oil discharge path of the branch path, through which oil is discharged from the accumulator; and operating the control solenoid to introduce a high-pressure oil into the control pressure chamber such that opening of the balance valve body is suppressed by a hydraulic pressure of the high-pressure oil.

8. The hydraulic control method according to claim 7, wherein the equipment to which the oil is supplied comprises a transmission.

9. The hydraulic control method according to claim 7, wherein the control solenoid comprises an electromagnetic control valve which has three oil input/output ports for paths A, B, and C and is switched between a mode A in which the paths B and A are connected and the paths B and C are disconnected and a mode C in which the paths B and C are connected and the paths B and A are disconnected, the path A of the control solenoid, the reference pressure chamber and a downstream side of the check valve of the oil inlet path are connected directly or via the accumulator, and the control pressure chamber and the path B of the control solenoid are connected, when the oil pump performs a pressurization operation or is stopped, the control solenoid is put into the mode A to introduce high-pressure oil into the control pressure chamber so that opening of the balance valve body is suppressed by the hydraulic pressure of the high-pressure oil to close the oil discharge path, and immediately after a command for restarting the engine is issued, the control solenoid is put into the mode C to discharge the high-pressure oil to decrease the hydraulic pressure of the control pressure chamber so that the balance valve body is positioned on the opening side by a repulsive force of the opening compression spring to open the oil discharge path.

10. The hydraulic control method according to claim 9, wherein the hydraulic control apparatus includes a controller that controls the control solenoid, a present flag and a past flag that record an operation and stopping state of the engine or the oil pump are provided in a memory of the controller, the past flag is bit-set in advance, and the control solenoid is set to the mode A in advance, the present flag is updated every time an operation of the engine or the oil pump is checked, the present flag is bit-set when the engine or the oil pump is operating, and the present flag is bit-reset when the engine or the oil pump is stopped, when the past flag is bit-reset and the present flag is bit-set, the control solenoid is put into the mode C to open the discharge path, when the past flag is not bit-reset and the present flag is not bit-set, the control solenoid is set to the mode A to close the discharge path, and the past flag is updated with the content of the present flag before the operation of the engine or the oil pump is checked again.

11. The hydraulic control apparatus according to claim 2, wherein in relation to the check valve provided in the middle of the oil inlet path, a portion of the oil inlet path close to the main passage is referred to as an inlet upstream path, and a portion of the oil inlet path close to the accumulator is referred to as an inlet downstream path, in relation to the balance valve unit provided in the middle of the oil discharge path, a portion of the oil discharge path close to the accumulator is referred to as a discharge upstream path, and a portion of the oil discharge path close to the main passage is referred to as a discharge downstream path, the inlet downstream path also serves as the discharge upstream path, and the inlet upstream path also serves as the discharge downstream path, the check valve provided in the oil inlet path is incorporated into the reference pressure chamber, and the balance valve body is inserted through an insertion hole formed between the reference pressure chamber and the control pressure chamber, an O-ring is provided in a lateral portion of the balance valve body, and the opening compression spring moves the balance valve body toward the reference pressure chamber to open the check valve, a piston is provided at one end of the balance valve body present in the control pressure chamber and in a vicinity of the end and the piston receives hydraulic pressure to move the balance valve body toward the control pressure chamber, when the oil pump performs the pressurization operation or is stopped, the control solenoid is put into the mode A to introduce oil into the control pressure chamber so that the hydraulic pressure of the oil moves the piston toward the control pressure chamber to suppress opening of the check valve, and immediately after the command for restarting the engine is issued, the control solenoid is put into the mode C to discharge the high hydraulic pressure of the control pressure chamber so that the check valve is open by the repulsive force of the opening compression spring to open the oil discharge path.

12. The hydraulic control apparatus according to claim 11, wherein a cylindrical hollow portion formed in the piston receives an end of the opening compression spring, or a small-diameter convex portion formed at an end of the piston is inserted into the opening compression spring.

13. The hydraulic control apparatus according to claim 11, wherein the check valve is formed of a push-back valve body and a compression biasing spring that biases the push-back valve body in a direction opposite to a direction in which oil flows into the accumulator, an end of the balance valve body present in the reference pressure chamber is formed as a protrusion and comes into contact with the push-back valve body, and the push-back valve body has a greater hardness than the protrusion.

14. The hydraulic control method according to claim 8, wherein the control solenoid comprises an electromagnetic control valve which has three oil input/output ports for paths A, B, and C and is switched between a mode A in which the paths B and A are connected and the paths B and C are disconnected and a mode C in which the paths B and C are connected and the paths B and A are disconnected, the path A of the control solenoid, the reference pressure chamber and a downstream side of the check valve of the oil inlet path are connected directly or via the accumulator, and the control pressure chamber and the path B of the control solenoid are connected, when the oil pump performs a pressurization operation or is stopped, the control solenoid is put into the mode A to introduce high-pressure oil into the control pressure chamber so that opening of the balance valve body is suppressed by the hydraulic pressure of the high-pressure oil to close the oil discharge path, and immediately after a command for restarting the engine is issued, the control solenoid is put into the mode C to discharge the high-pressure oil to decrease the hydraulic pressure of the control pressure chamber so that the balance valve body is positioned on the opening side by a repulsive force of the opening compression spring to open the oil discharge path.

15. The hydraulic control method according to claim 14, wherein the hydraulic control apparatus includes a controller that controls the control solenoid, a present flag and a past flag that record an operation and stopping state of the engine or the oil pump are provided in a memory of the controller, the past flag is bit-set in advance, and the control solenoid is set to the mode A in advance, the present flag is updated every time an operation of the engine or the oil pump is checked, the present flag is bit-set when the engine or the oil pump is operating, and the present flag is bit-reset when the engine or the oil pump is stopped, when the past flag is bit-reset and the present flag is bit-set, the control solenoid is put into the mode C to open the discharge path, when the past flag is not bit-reset and the present flag is not bit-set, the control solenoid is set to the mode A to close the discharge path, and the past flag is updated with the content of the present flag before the operation of the engine or the oil pump is checked again.

\* \* \* \* \*